(12) United States Patent
Oka

(10) Patent No.: US 6,842,174 B2
(45) Date of Patent: Jan. 11, 2005

(54) GRAPHICS DATA GENERATING METHOD, GRAPHICS GENERATING APPARATUS AND COMPONENTS THEREOF

(75) Inventor: Masaaki Oka, Kanagawa (JP)

(73) Assignee: Sony Computer Entertainment Inc. (JP)

(*) Notice: Subject to any disclaimer, the term of this patent is extended or adjusted under 35 U.S.C. 154(b) by 496 days.

(21) Appl. No.: 09/929,146

(22) Filed: Aug. 14, 2001

(65) Prior Publication Data

US 2002/0047842 A1 Apr. 25, 2002

(30) Foreign Application Priority Data

Aug. 15, 2000 (JP) .................................... 2000-246508
Aug. 14, 2001 (JP) .................................... 2001-246092

(51) Int. Cl.[7] ............................................. G06T 15/00
(52) U.S. Cl. ..................................... 345/420; 345/582
(58) Field of Search ................................. 345/420, 423, 345/427, 428, 581, 441, 582, 586

(56) References Cited

U.S. PATENT DOCUMENTS 5,367,615 A * 11/1994 Economy et al. ........... 345/441

OTHER PUBLICATIONS

Fournier et al., "Computer Rendering of Stochastic Models", ACM, 1982, pp 371–384.*

* cited by examiner

Primary Examiner—Almis R. Jankus
(74) Attorney, Agent, or Firm—Lerner, David, Littenberg, Krumholz & Mentlik, LLP

(57) ABSTRACT

A method executed in an apparatus for generating graphics data indicating shape features of three-dimensional graphics based on X, Y and Z coordinate values, which includes the steps of generating a random number using the X and Y coordinate values of a plurality of shape specific points to determine a two-dimensional shape of the target three-dimensional graphics as seeds of random numbers, calculating a Z coordinate value of the shape specific point based on the generated random number and generating the graphics data based on the calculated Z coordinate value and the X and Y coordinate values of the specific points.

17 Claims, 7 Drawing Sheets

GRAPHICS DATA GENERATING METHOD, GRAPHICS GENERATING APPARATUS AND COMPONENTS THEREOF

CROSS-REFERENCE TO RELATED APPLICATIONS

This application is based upon and claims the benefit of priority from the prior Japanese Patent Applications Nos. 2000-246508, file Aug. 15, 2000, and 2001-246092, filed Aug. 14, 2001, the entire contents of both of which are incorporated herein by reference.

BACKGROUND OF THE INVENTION

1. Field of the Invention

The present invention relates to a graphics data generation technology for generating graphics of natural objects, for example, mountain and coastline using computer graphics, and more specifically, to a technique for avoiding unnatural modes when determining the shapes of the above-described graphics using random numbers.

2. Description of the Related Art

In the field of computer graphics, to express natural objects such as mountain and coastline in the most natural possible manner, a shape of a graphics object that varies from one place to another may be determined using random numbers. For example, in a video game, when it is desired to express graphics such as a far mountain behind a moving character in a more natural manner, shapes of parts of the graphics are determined using random numbers.

An example of a graphic shape determining technique using random numbers is a fractal technique. The fractal technique is a technique for obtaining a CG (computer graphics) image by generating fractal graphics inside an information processing apparatus.

Conventionally, a fractal graphics is generated by an information processing apparatus as follows.

First, a plurality of shape specific points is determined to specify the shape of the fractal graphics according to the purpose of software. For example, in the case where a target graphics is a three-dimensional graphics, when projected onto an XY plane in an orthogonal coordinate system made up of the X-axis, Y-axis and Z-axis, each shape specific point is placed at one or a plurality of vertices of a quadrangle.

Once a plurality of shape specific points is determined, then midpoint division is performed. That is, the X and Y coordinate values at a midpoint of each side of a quadrangle when each shape specific point is projected onto the XY plane, and the X and Y coordinate values at a midpoint of a line connecting the midpoint of the mutually facing sides of the quadrangle when projected on the XY plane are calculated. Then, the calculated X and Y coordinate values are determined as X and Y coordinate values of a new changeable shape specific point. Further, random numbers are generated and a Z coordinate value of the new shape specific point is determined using the random numbers generated. Random numbers are values generated according to a random number seed and the random number seed becomes an initial value for calculation of random numbers, and therefore a random number value is determined uniquely according to the random number seed. A random number generated immediately before is used as the random number seed.

The shape of a three-dimensional graphics is determined from the X, Y and Z coordinate values of the new shape specific point obtained in this way and the X, Y and Z coordinate values of a shape specific point placed beforehand, and this is used as the data ("graphics data") to be expressed on an external display, etc. connected to a computer.

Since the Z coordinate value of the new shape specific point is dependent on random numbers, the graphics expressed by the graphics data generated becomes a fractal graphics.

As described above, a Z coordinate value of a new shape specific point is determined using random numbers. However, since a random number generated immediately before is used as a random number seed, the conventional art involves problems as shown below.

For example, suppose a case where there is a fractal graphics in an image made up of a plurality of blocks shown on a display whose one screen displays only one block of the image and a character appearing in a video game moves within this image. In this case, when the character moves from the currently displayed block to another block, the screen shown on the display changes simultaneously with the movement of the character. A fractal graphics is generated every time the screen on the display is changed, and therefore even if the character arrives at a same point of a certain block after passing through a plurality of blocks, the shape of the graphics may be different depending on the blocks through which the character has passed before arriving at that point (originally, that shape must be identical no matter through what path the character has passed). This is because the conventional art uses a random number generated just before as is as the seed of the random number, which results in a different value depending on the blocks through which the character has passed.

Moreover, when the fractal graphics is expressed across a plurality of blocks as shown above, each fractal graphics is generated independently when the display of each block is changed. For this reason, succession of graphics from one block to another on the border of blocks may not take place smoothly.

Such a problem is not limited to fractal graphics alone but is common to all cases where graphics are formed whose shape specific points are determined using random numbers.

SUMMARY OF THE INVENTION

It is an object of the present invention to provide a new technology to solve the above-described problem.

In order to solve the above-described problem, the present invention provides an improved graphics data generating method, graphics generating apparatus, semiconductor device, computer program and recording medium.

The graphics data generating method of the present invention is as follows.

A first method is a method executed in an apparatus for generating graphics data indicating shape features of three-dimensional graphics based on X, Y and Z coordinate values, comprising the steps of determining X and Y coordinate values of a shape specific point for specifying the shape of the three-dimensional graphics, generating a random number using the X and Y coordinate values as seeds, calculating a Z coordinate value of the shape specific point based on the generated random number, and generating the graphics data based on this Z coordinate value and the X and Y coordinate values of the shape specific point.

Since the Z coordinate value of each shape specific point is uniquely determined by the X and Y coordinate values of the individual specific point, it is possible to obtain a graphics of the same shape no matter through what path the three-dimensional graphics is generated. Further, for example, in the case of an image made up of a plurality of blocks where one screen can display only one block of the image even when a three-dimensional graphics exists across a plurality of blocks, succession of graphics from one block to another on the border of blocks takes place smoothly.

A second method is a method executed in an apparatus for generating graphics data indicating shape features of three-dimensional graphics based on X, Y and Z coordinate values, comprising the steps of setting a shape specific point provisionally among a plurality of shape specific points for specifying the shape of the three-dimensional graphics, calculating X and Y coordinate values of the provisional shape specific point and generating a random number using the X and Y coordinate values as seeds, calculating a Z coordinate value based on the generated random number, and using the point including the calculated X, Y and Z coordinate values as a new shape specific point and generating the graphics data based on the new shape specific point.

The Z coordinate value of a new shape specific point is uniquely determined by the X and Y coordinate values of the new shape specific point. Since a new shape specific point is calculated from the shape specific point and the number of points to determine the shape of the graphics is increased in this way, it is possible to obtain a graphics of a more finely defined shape.

In the second method, the X and Y coordinate values of the new shape specific point can be obtained from the X and Y coordinate values of a midpoint between a pair of shape specific points which is the basis thereof. Further, the X and Y coordinate values of the new shape specific point can be obtained from the X and Y coordinate values of a midpoint of a virtual line connecting a midpoint of a first side of a quadrangle formed on a projecting plane when each of two pairs of shape specific points which are the basis thereof is projected onto the XY plane, and a midpoint of a second side facing the first side.

A third method is a method executed in an apparatus for generating graphics data indicating shape features of two-dimensional graphics based on X and Y coordinate values, comprising the steps of provisionally setting a shape specific point between a pair of neighboring shape specific points when a plurality of shape specific points for specifying the shape of the two-dimensional graphics is projected on the X-axis, generating a random number using the X coordinate value of this provisional shape specific point as a seed of random numbers, calculating the Y coordinate value based on the generated random number, and using the point including the calculated X and Y coordinate values as a new shape specific point and generating the graphics data based on this new shape specific point.

The Y coordinate value of a new shape specific point is uniquely determined by the X coordinate value of the new shape specific point. Therefore, it is always possible to obtain a graphics of almost the same shape no matter in what order the graphics are generated. Further, for example, in the case of an image made up of a plurality of blocks where one screen can display only one block of the image even when a two-dimensional graphics exists across a plurality of blocks, succession of two-dimensional graphics from one block to another on the border of blocks takes place smoothly.

A graphics generating apparatus of the present invention is an apparatus for generating two-dimensional or three-dimensional graphics whose shape features are specified by positions of a plurality of shape specific points, comprising a random number generator for generating a random number whose value is determined according to a seed entered and a determinator for determining positions of the plurality of shape specific points. The position of at least one of the plurality of shape specific points is expressed by default coordinate values and variable coordinate values. The determinator instructs the random number generator to generate a random number using the default coordinate values at any one of the shape specific points as the seed and determines the position of at least one shape specific point by calculating the variable coordinate values based on the random number.

The "default coordinate value" refers to a coordinate value that is necessarily determined when the position of a graphics is determined and the "variable coordinate value" refers to a coordinate value that is variable at random.

When there is a plurality of the default coordinate values, the determinator may also be configured to generate the random number using random number generating functions differing from one coordinate value to another.

In the case where the above-described graphics is a three-dimensional graphics based on the X, Y and Z coordinate values, the above-described default coordinate values are the X and Y coordinate values of one of the above-described plurality of shape specific points, and the above-described variable coordinate value is the Z coordinate value of any one of said shape specific points. Furthermore, in the case where the above-described graphics is a two-dimensional graphics based on the X and Y coordinate values, the above-described default coordinate value is the X coordinate value of any one of said plurality of shape specific points, and the above-described variable coordinate value is the Y coordinate value of one of said shape specific points.

The graphics generating apparatus according to the present invention further comprises a storage unit for storing X, Y and Z coordinate values of at least two of the plurality of shape specific points and a shape specific point generator for specifying the positions of shape specific points based on the X, Y and Z coordinate values of a pair of shape specific points read from this storage unit and generating a midpoint of a virtual line connecting between the specified shape specific points as a new shape specific point.

In such a graphics generating apparatus, the determinator instructs the random number generator to generate a random number using the X and Y coordinate values of the new shape specific point as the seed and determines the position of the new shape specific point by calculating the Z coordinate value of the new shape specific point based on the random number.

The graphics generating apparatus of the present invention further comprises a storage unit for storing X, Y and Z coordinate values of at least some of the plurality of shape specific points and a shape specific point generator for generating a midpoint of a virtual line connecting between a midpoint of a first side of a quadrangle formed on a projecting plane when each of two pairs of shape specific points read from this storage unit is projected onto the XY plane, and a midpoint of a second side facing the first side as a new shape specific point.

In such a graphics generating apparatus, the determinator instructs the random number generator to generate a random number using the X and Y coordinate values of the new shape specific point as the seed and determines the position of the new shape specific point by calculating the Z coordinate value of the new shape specific point based on the random number.

A semiconductor device of the present invention is incorporated in an apparatus provided with a random number generator for generating a random number whose value is determined according to a seed entered, for generating two-dimensional or three-dimensional graphics whose shape features are specified according to the positions of a plurality of shape specific points in coordination with this apparatus. The position of at least one of the plurality of shape specific points is expressed by default coordinate values and variable coordinate values. The semiconductor device further comprises means for instructing the random number generator to generate a random number using the default coordinate values at any one of the shape specific points as the seed and determining the position of the one shape specific point by calculating the variable coordinate value based on the random number.

A computer program of the present invention is a computer program for rendering a computer to serve as a graphics generating apparatus for generating two-dimensional or three-dimensional graphics whose shape features are specified according to the positions of a plurality of shape specific points. The graphics generating apparatus comprises a random number generator for generating a random number whose value is determined according to a seed entered and a determinator for determining positions of the plurality of shape specific points. The position of at least one of the plurality of shape specific points is expressed by default coordinate values and variable coordinate values. The determinator instructs the random number generator to generate a random number using the default coordinate values at any one of the shape specific points as the seed and determines the position of the shape specific point by calculating the variable coordinate values based on the random number.

BRIEF DESCRIPTION OF THE DRAWINGS

These objects and other objects and advantages of the present invention will become more apparent upon reading of the following detailed description and the accompanying drawings in which.

DETAILED DESCRIPTION OF THE PREFERRED EMBODIMENT

An embodiment of the present invention will be specifically described with reference to the drawings accompanying herewith.

<Information Processing Apparatus>

Figure 1:
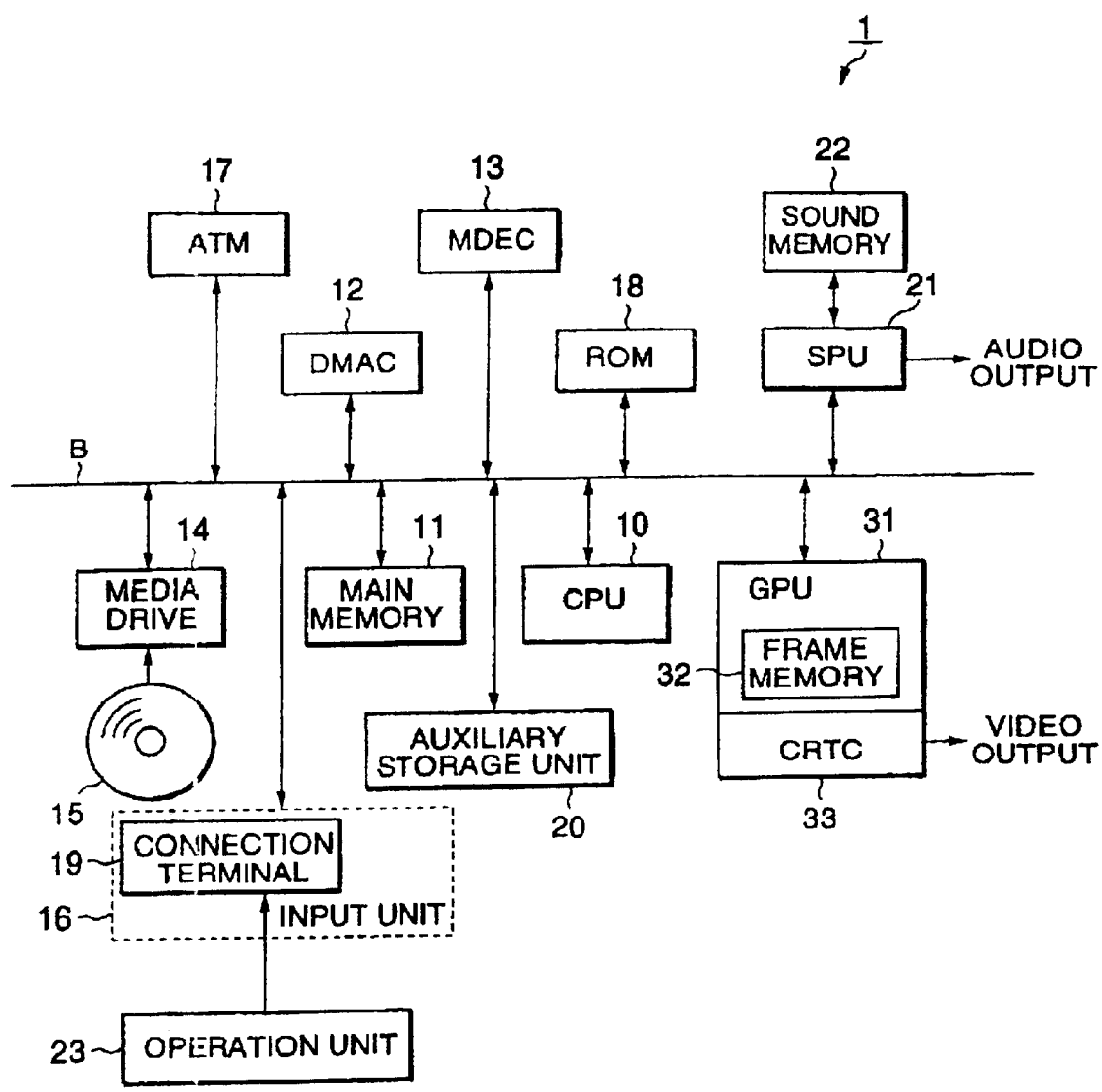
FIG. 1 is an internal block diagram of an information processing apparatus to which the present invention is applied.

FIG. 1 is an internal block diagram of an information processing apparatus to which the present invention is applied.

This information processing apparatus 1 comprises a CPU 10, a main memory 11 made up of a RAM, a DMAC (direct memory access controller) 12, an MPEG (Moving Picture Experts Group) decoder (MDEC) 13, a media drive 14 for mounting a medium 15 such as a CD-ROM or DVD-ROM, an input unit 16, a communication controller (ATM) 17 for transmitting/receiving information with an external device via a network, a ROM 18 for storing a program such as BIOS, an auxiliary storage unit 20 such as a hard disk, a sound processing unit (SPU) 21 for reading sound data stored in a sound memory 22 and outputting as audio output, and a graphic processing unit (hereinafter referred to as "GPU") 31 having a frame memory 32. These are connected via a bus B.

The GPU 31 is connected with a CRTC (CRT controller) 33 for generating a video output signal. This video output signal is generated in compliance with standards of NTSC and PAL, etc., and output from the CRTC to a display (not shown).

The CPU 10 is a semiconductor device that reads a start program from the auxiliary storage unit 20 at the startup of the information processing apparatus 1, executes the start program and operates an operating system. The CPU 10 also has the functions of controlling the media drive 14, reading an application program or data from the medium 15 mounted in this media drive 14 and storing this in the main memory 11. The CPU 10 further has the functions of applying geometry processing (coordinate value calculation processing) to various data read from the medium 15 and auxiliary storage unit 20, for example, three-dimensional object data (coordinate values of vertices of a polygon, etc.) made up of a plurality of basic graphics (polygons) and generating a display list containing geometry-processed polygon definition information (specifications of shape of polygon used, its formation position, type, color or texture, etc. of components of the polygon).

The GPU 31 is a semiconductor device that has the functions of storing drawing context (type, color or texture, etc. of components of polygon for drawing), carrying out rendering processing (drawing processing) by reading necessary drawing context according to the display list notified from the CPU 10 and drawing polygons in the frame memory 32. The frame memory 32 can also use this as a texture memory. Thus, a pixel image in the frame memory can be pasted as texture to a polygon to be drawn.

The SPU 21 is a semiconductor device that synthesizes sound data read from the sound memory 22 into an audio output signal. The DMAC 12 is a semiconductor device that carries out DMA transfer control over the circuits connected to the bus B. The MDEC 13 is a semiconductor device that operates in parallel with the CPU 10 and has the function of expanding data compressed in MPEG (Moving Picture Experts Group) or JPEG (Joint Photographic Experts Group) systems, etc.

The input unit 16 is provided with a connection terminal 19 through which an input signal from an operation unit 23 is input. The operation unit 23 is provided with a plurality of operation buttons and allows the operator to reshape graphics shown on the display to more complicated and natural shape or confirm the content of the displayed graphics using these operation buttons in a variety of ways.

<Configuration of Graphics Generating Apparatus>

A configuration example when the above-described information processing apparatus 1 is operated as the graphics generating apparatus of the present invention will be explained.

The graphics generating apparatus is implemented by the CPU 10 and GPU 31 of the information processing apparatus 1 loading and executing predetermined computer programs recorded in the auxiliary storage unit 20, ROM 18, or other recording medium such as medium 15. Here, as in the case of the conventional art, an example will be explained where midpoint division is applied to midpoints between shape specific points, graphics data is generated using random numbers and the image drawn based on this graphics data is displayed on the display.

Figure 2:
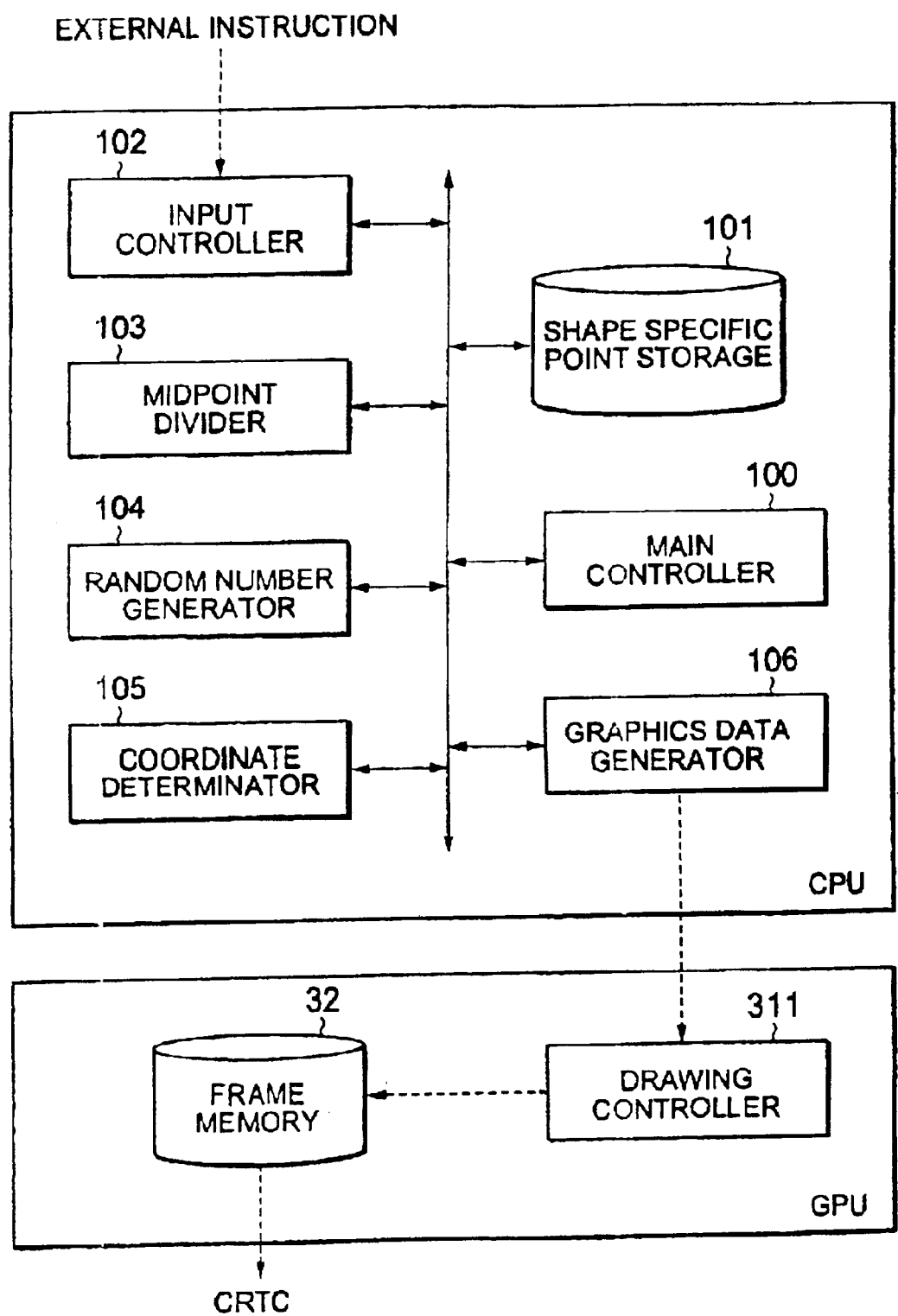
FIG. 2 is a functional block diagram of a graphics generating apparatus according to this embodiment.

FIG. 2 is a functional block diagram of the information processing apparatus 1 when the information processing apparatus operates as the graphics generating apparatus. In this embodiment, the CPU 10 and computer program form functional blocks (modules) such as a main controller 100, an input controller 102, a midpoint divider 103, a random number generator 104, a coordinate determinator 105 and a graphics data generator 106 inside the CPU 10, and form a shape specific point storage 101 in a memory area (not shown) in the CPU 10.

Furthermore, the CPU 10 and computer program form a functional block (module) of the graphics control unit 311 in the GPU 31.

Then, the CPU 10 and computer program derive a new shape specific point from the coordinate values of a shape specific point (a point to specify the shape of a graphics, the same will apply hereinafter) stored in the shape specific point storage 101 and generate graphics data including the specification of information (drawing context) necessary for the coordinate values of this new shape specific point and drawing of graphics. The coordinate values refer to coordinate values in a three-dimensional orthogonal coordinate system made up of the X-axis, Y-axis and Z-axis (each referred to as X coordinate value, Y coordinate value and Z coordinate value). In relation to the above-described explanation on the information processing apparatus 1, a vertex of a polygon corresponds to a "shape specific point" and the display list corresponds to "graphics data".

The main controller 100 carries out data exchange between the functional blocks related to the generation of graphics data, transmission of the graphics data generated to the GPU 31 and storage and reading of coordinate values of each shape specific point into the shape specific point storage 101.

The shape specific point storage 101 stores coordinate values of a plurality of shape specific points. There are various modes of storing coordinate values of shape specific points.

For example, it may be arranged that only default X and Y coordinate values are stored as coordinate values of shape specific points stored by default and when a Z coordinate value of each shape specific point which is a variable coordinate value is calculated through coordinate determination processing which will be described later, the Z coordinate value is stored for each shape specific point in a freely updatable manner or it may also be arranged that X, Y and Z coordinate values of several shape specific points which become the basis for creating new shape specific points are stored as default coordinate values and every time a new shape specific point is generated, the X, Y and Z coordinate values of the new shape specific point are stored as the default coordinate values for when the next graphics is formed additionally. When only X and Y coordinate values are stored, these may also be listed in a table in a graphic map format.

It may be arranged that default coordinate values of shape specific points are set by the operator arbitrarily, or automatically determined according to the type of data or application accompanying the above-described computer program.

In this embodiment, suppose X, Y and Z coordinate values of several basic shape specific points are stored in the shape specific point storage 101 and when graphics data is generated, these shape specific points are read one after another, new shape specific points are generated and their X, Y and Z coordinate values are stored one after another.

The input control unit 102 performs control for storing coordinate values in the shape specific point storage 101 for every shape specific point, receiving instructions from an external device, for example, instructions from the operation unit 23, incorporating coordinate values of necessary shape specific points from the shape specific point storage 101 according to these external instructions and sending them to the midpoint divider 103 and graphics data generator 106, etc.

The midpoint divider 103 performs midpoint division to segment graphics according to external instructions and calculates coordinate values of a midpoint between shape specific points from coordinate values of a plurality of shape specific points of a target graphics and further calculates coordinate values of a midpoint between the midpoints as required.

The random number generator 104 generates random numbers used to determine a Z coordinate value for every shape specific point (including a midpoint). X and Y coordinate values of the shape specific point (or midpoint) are used as the seed of random numbers. Random numbers are generated within a predetermined numerical range. The predetermined numerical range refers to, for example, a range of $\pm\sigma/2n$ (n: 1, 2, . . . ) using a standard deviation $\sigma$ of Z coordinate values of all shape specific points stored in the shape specific point storage 101.

The coordinate determinator 105 performs processing to finally determine coordinate values of a new shape specific point using the coordinate values of the midpoint determined by the midpoint divider 103 and a random number generated by the random number generator 104.

The graphics data generator 106 determines the shape of a graphics to be drawn based on the coordinate values of the shape specific points stored beforehand in the shape specific point storage 101 and newly created shape specific point and generates graphics data of the shape of this graphics.

The drawing controller 311 draws a graphics in the frame memory 32 when the graphics data generated as shown above is entered. This is done by, for example, drawing a triangle or quadrangle specified by a plurality of shape specific points with a polygon. The data drawn in the frame memory 32 is sent to the display as a video output signal.

<Operation of Graphics Generating Apparatus>

Then, an operation of the graphics generating apparatus will be explained more specifically. Here, an example will be explained where a three-dimensional fractal graphics is created according to instructions from the operation unit which is an example of external instruction and this is shown on the display.

Figure 3:
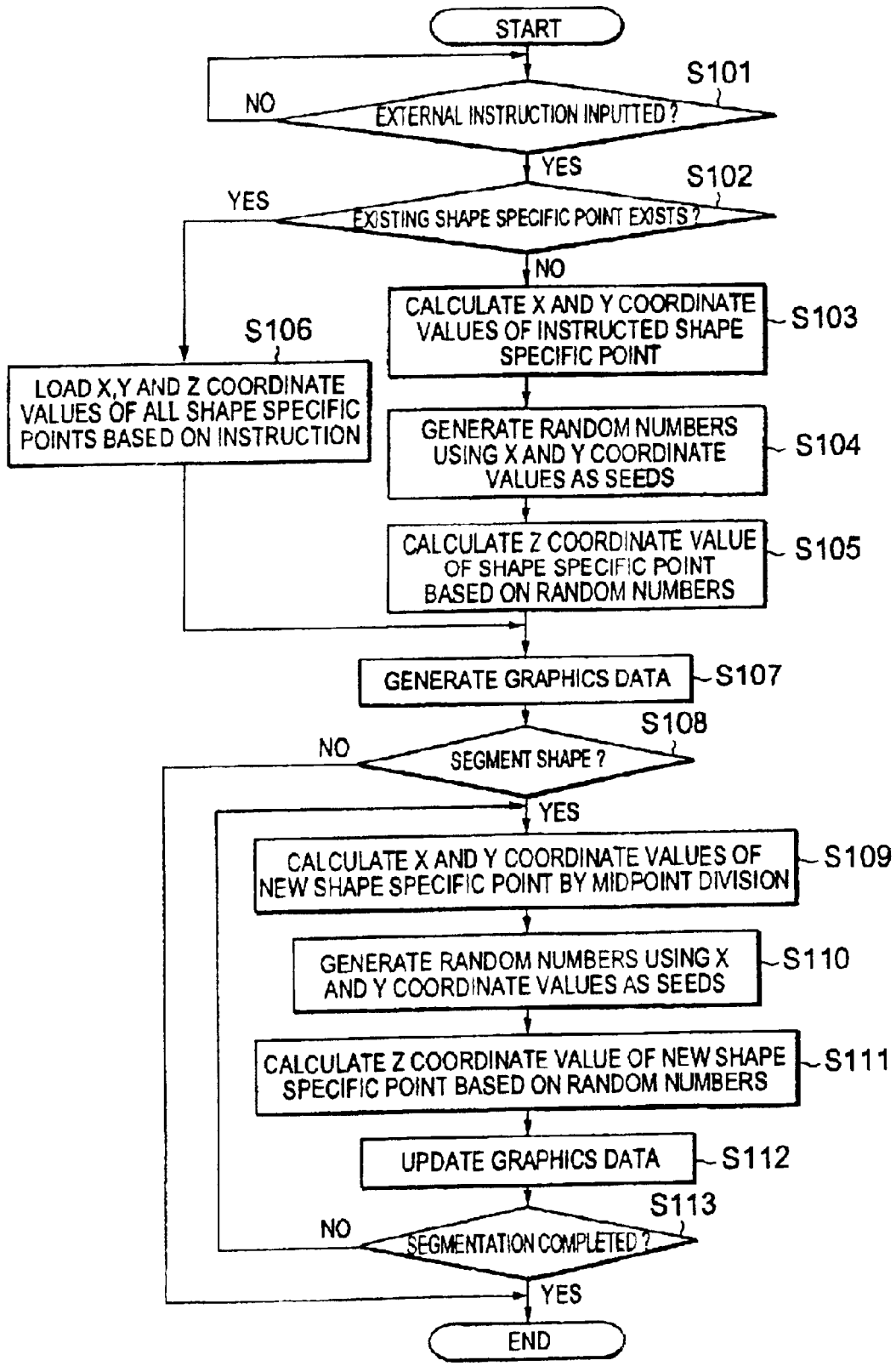
FIG. 3 is a flow chart showing a procedure for generating graphics data according to this embodiment.

FIG. 3 is a flow chart showing the procedure for generating graphics data in this case.

When an instruction (for graphics drawing) is input from the operation unit 23, the main controller 100 checks whether the shape specific points about the target graphics are already stored or not (step S101: Yes, S102). If the shape specific points are not stored, the X and Y coordinate values of the shape specific points to specify the shape of the specified graphics are calculated (step S103) and a random number is generated using these X and Y coordinate values as a seed by the random number generator 104 (step S104). Then, based on the random number, the Z coordinate values of the shape specific points are calculated (step S105).

On the other hand, if the shape specific points are stored, the X, Y and Z coordinate values of all shape specific points are read from the shape specific point storage 101.

When all shape specific points are determined in the above-described procedure, the graphics data generator 106 generates graphics data including coordinate values of the respective shape specific points and stores this graphics data in a work memory in the CPU 10 (S107).

Figure 4:
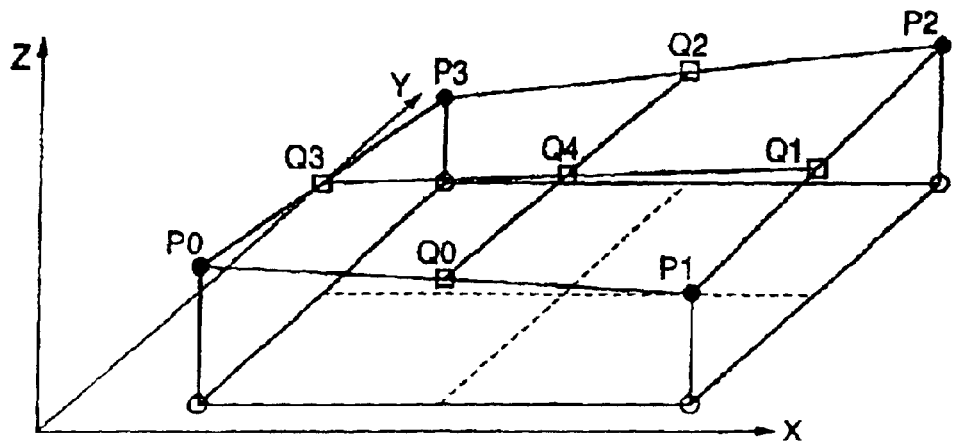
FIG. 4 is a schematic diagram showing an image of a three-dimensional fractal graphics.

FIG. 4 shows an image of the three-dimensional fractal graphics drawn with such graphics data. In the figure, the points expressed with "●" are shape specific points P0 to P3 and, when projected onto the XY plane in the orthogonal coordinate system, these points are each placed at vertices of a quadrangle formed on the projecting plane.

The X, Y and Z coordinate values of the respective shape specific points are expressed as follows:

P0=(XP0, YP0, ZP0)
P1=(XP1, YP1, ZP1)
P2=(XP2, YP2, ZP2)
P3=(XP3, YP3, ZP3)

When an instruction for segmenting the graphics is input, the midpoint divider 103 carries out midpoint division processing on the shape specific points P0 to P3. More specifically, when the shape specific points P0 to P3 are projected onto the XY plane, the X, Y and Z coordinate values of the midpoints Q0 to Q3 of the sides of the quadrangle and the X, Y and Z coordinate values of a midpoint Q4 of a virtual line connecting between the midpoints of the mutually facing sides of this quadrangle are calculated (step S108: Yes, S109). These midpoints Q0 to Q4 are expressed with "□" in FIG. 4.

The X, Y and Z coordinate values of the midpoint Q0 are expressed as follows:

XQ0=(XP0+XP1)/2
YQ0=(YP0+YP1)/2
ZQ0=(ZP0+ZP1)/2

The X, Y and Z coordinate values of the midpoints Q1, Q2 and Q3 are also calculated in the same way. The X, Y and Z coordinate values of the midpoint Q4 are expressed as follows:

XQ4=(XP0+XP1+XP2+XP3)/4
YQ4=(YP0+YP1+YP2+YP3)/4
ZQ4=(ZP0+ZP1+ZP2+ZP3)/4

Of the calculated X, Y and Z coordinate values of the midpoints Q0 to Q4, the X and Y coordinate values are sent to the random number generator 104.

The random number generator 104 generates the respective X and Y coordinate values of the midpoints of Q0 to Q4 as the seeds of random numbers (step S110).

There may be various techniques as to how to generate random numbers. This embodiment illustrates two types of mode.

A first mode is a mode in which a random number is generated only once. The Random number in this mode is expressed as follows when, for example, the X and Y coordinate values of Q0 are assumed to be the seed:

$$\text{seed\_random } (f(XQ0, YQ0)) \text{ random (1)}$$

"seed_random (f(XQ0, YQ0))" indicates that the X and Y coordinate values of the midpoint Q0 are set in the random number generator 104 as the seed of random numbers. The function f is, for example, "f(X, Y)=X*10000+Y". "random (1)" means a random number generated by "seed_random (f(XQ0, YQ0))". (1) indicates that the numerical range of random numbers is the range of 1 σ where σ is a standard deviation of the aforementioned Z coordinate value.

Random numbers are calculated for each of the midpoints Q0 to Q4. The seeds of random numbers for Q1 to Q4 are expressed as follows:

seed_random (f(XQ1, YQ1))
seed_random (f(XQ2, YQ2))
seed_random (f(XQ3, YQ3))
seed_random (f(XQ4, YQ4))

The value of random number (random (1)) is uniquely determined by "seed_random (f (X, Y))" which is the seed. "seed_random (f(X, Y))" is a function dependent on the X and Y coordinate values and this value is uniquely determined once the X and Y coordinate values are determined. Thus, random number (random (1)) is a value only dependent on the X and Y coordinate values and this value is uniquely determined once the X and Y coordinate values are determined.

A second mode of generating random numbers is a mode in which two types of mutually different random number generating functions for the X and Y coordinate values are generated, that is, different random numbers are generated even if a same seed is input.

As in the case of the first mode, random numbers are expressed as follows when the X and Y coordinate values of Q0 are assumed to be the seed:

$$f(\text{seed\_random\_1 } (XQ0), \text{seed\_random\_2 } (YQ0)) \text{ random } A(1)$$

"seed_random_1" and "seed_random_2" are both random generating functions and "random A(1)" means a random number generated by "f(seed_random_1 (XQ0), seed_random_2(YQ0))". In this mode, if (XQ0, YQ0) is determined, the respective random number generating functions calculate the respective predetermined values and the output from the random generator 104 is also determined uniquely.

The firs mode has an advantage that random number only needs to be generated once. For example, in the case of a function such as f(X, Y) =X*10000+Y, crests and troughs to be expressed are aligned linearly and periodically and it may look unnatural when viewed in a wide range. On the other hand, the second mode generates random numbers for the X and Y coordinate values from the seed using two types of random number generating functions which are not related to each other, which prevents the above-described pattern from being generated, avoiding unnaturalness reliably.

The random number functions in the second mode are not always limited to the two types above.

Then, the coordinate determinator 105 determines the X, Y and Z coordinate values of new shape specific points P4 to P8 from the X, Y and Z coordinate values of the midpoints Q0 to Q4 obtained by midpoint division and the random numbers generated by random number generator 104 (step S111) and the graphics data generator 106 updates the previously generated graphics data (step S112).

For the X and Y coordinate values of the shape specific points P4 to P8, the X and Y coordinate values of the midpoints Q0 to Q4 can be used When random numbers are generated in the first mode, these X and Y coordinate values are expressed as follows:

X coordinate value of P4: XP4=(XP0+XP1)/2
Y coordinate value of P4: YP4=(YP0+YP1)/2
X coordinate value of P5: YP5=(XP1+XP2)/2

Y coordinate value of P5: $YP5=(YP1+YP2)/2$

X coordinate value of P6: $XP6=(XP2+XP3)/2$

Y coordinate value of P6: $YP6=(YP2+YP3)/2$

X coordinate value of P7: $XP7=(XP3+XP0)/2$

Y coordinate value of P7: $YP7=(YP3+YP0)/2$

X coordinate value of P8: $XP8=(XP0+XP1+XP2+XP3)/4$

Y coordinate value of P8: $YP8=(YP0+YP1+YP2+YP3)/4$

The Z coordinate values of the shape specific points P4 to P8 are calculated from the Z coordinate values of the midpoints Q0 to Q4 and random numbers as follows:

Z coordinate value of P4: $ZP4=(ZP0+ZP1)/2+\text{random}\,(1)$

Z coordinate value of P5: $ZP5=(ZP1+ZP2)/2+\text{random}\,(1)$

Z coordinate value of P6: $ZP6=(ZP2+ZP3)/2+\text{random}\,(1)$

Z coordinate value of P7: $ZP7=(ZP3+ZP0)/2+\text{random}\,(1)$

Z coordinate value of P8: $ZP8=(ZP0+ZP1+ZP2+ZP3)/4+\text{random}\,(1)$

On the other hand, when random numbers are generated in the second mode, the Z coordinate values at the shape specific points P4 to P8 are expressed as follows:

Z coordinate value of P4: $ZP4=(ZP0+ZP1)/2+\text{random A}\,(1)$

Z coordinate value of P5: $ZP5=(ZP1+ZP2)/2+\text{random A}\,(1)$

Z coordinate value of P6: $ZP6=(ZP2+ZP3)/2+\text{random A}\,(1)$

Z coordinate value of P7: $ZP7=(ZP3+ZP0)/2+\text{random A}\,(1)$

Z coordinate value of P8: $ZP8=(ZP0+ZP1+ZP2+ZP3)/4+\text{random A}\,(1)$

Figure 5:
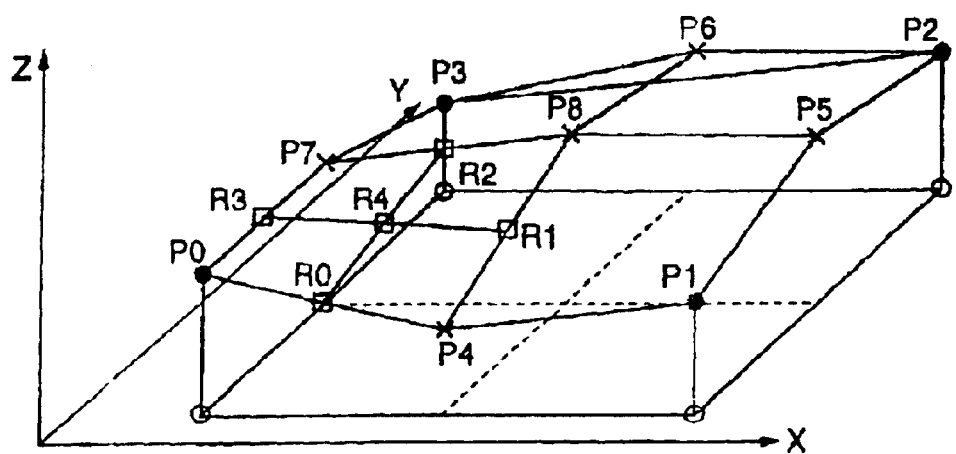
FIG. 5 is a schematic diagram showing an image of a three-dimensional fractal graphics to be segmented.

FIG. 5 shows an image diagram of the three-dimensional fractal graphics specified by the new shape specific points P4 to P8 generated in this way and the initial shape specific points P0 to P3. The new shape specific points P4 to P8 are expressed with "x" in FIG. 5.

When the graphics as shown in FIG. 5 is further segmented, the processing in and after step S109 is carried out again (step S113: No). Whether segmentation should be carried out or not is judged based on, for example, whether a further segmentation instruction from the operation apparatus 23 has been accepted or not or whether a confirmation instruction has been accepted or not.

In any case where segmentation is carried out, the previously calculated X, Y and Z coordinate values of the shape specific points P4 to P8 are stored in the shape specific point storage 101 and treated in the same way as the aforementioned shape specific points P0 to P3. That is, the shape specific points P0 to P8 are treated in the same way as the shape specific points P0 to P3 and the processing at step S103 is carried out by the midpoint divider 103.

Further segmentation may also be carried out for all quadrangle sections specified by all the shape specific points P0 to P3 or only for some quadrangle sections.

The following is an example of segmentation of some quadrangle sections, that is, segmentation of the quadrangle section specified by the shape specific points P0, P4, P8 and P7 in FIG. 5.

First, the X, Y and Z coordinate values of midpoints R0 to R3 of the sides of the quadrangle formed by the shape specific points P0, P4, P8 and P7 when projected onto the XY plane, and a midpoint R4 of a virtual line connecting the midpoints of the mutually facing sides of the quadrangle are calculated from the X, Y and Z coordinate values of the shape specific points P0, P4, P8 and P7. These midpoints R0 to R4 are expressed with "□" in FIG. 5.

The X coordinate value XR0, Y coordinate value YR0 and Z coordinate value ZR0 of the midpoint R0 are calculated as follows:

$XR0=(XP0+XP4)/2$ $YR0=(YP0+YP4)/2$ $ZR0=(ZP0+ZP4)/2$

The X, Y and Z coordinate values of the midpoints R1, R2 and R3 are also calculated using the same procedure. By the way, the X coordinate value XR4, Y coordinate value YR4 and Z coordinate value ZR4 of the midpoint R4 are calculated as follows:

$XR4=(XP0+XP4+XP8+XP7)/4$ $YR4=(YP0+YP4+YP8+YP7)/4$ $ZR4=(ZP0+ZP4+ZP8+ZP7)/4$

Of these values, the X and Y coordinate values are sent to the random number generator 104.

The random number generator 104 generates random numbers again. For the seeds of random numbers, the X and Y coordinate values of the respective midpoints R0 to R4 are used. For example, the seed of random numbers by the midpoint R0 is "seed_random (f (XR0, YR0))". Furthermore, the numerical range in which random numbers are generated is assumed to be different from the aforementioned range. For example, the range is assumed to be ½ of the standard deviation σ of the aforementioned Z coordinate value. The random number generated in this way is described as "random (½)".

Figure 6:
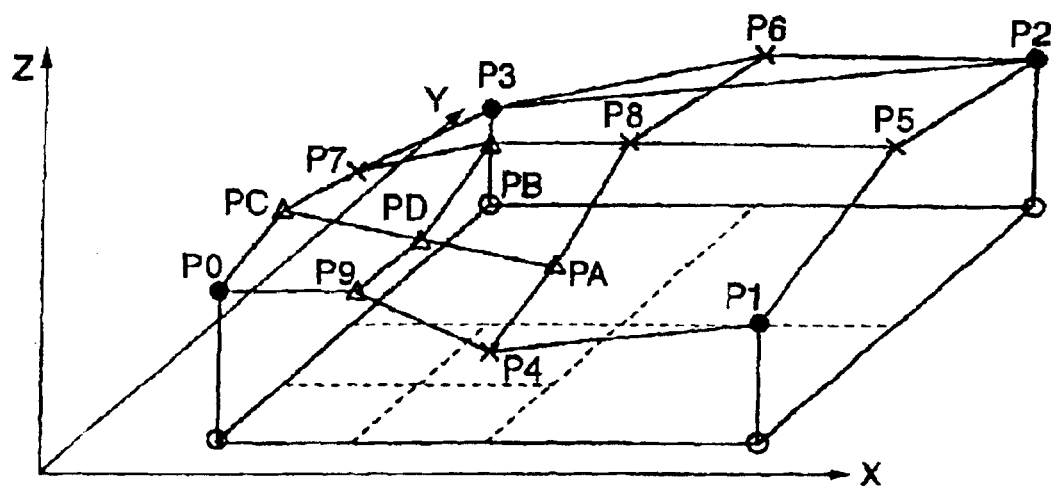
FIG. 6 is a schematic diagram showing an image of a three-dimensional fractal graphics to be segmented more finely.

The coordinate determinator 105 determines the X, Y and Z coordinate values of a new shape specific point from the coordinate values of the midpoints R0 to R4 obtained by, midpoint division and random numbers generated by the random number generator 104. This processing is carried out in the same way as the aforementioned processing. In this way, in FIG. 6, the X, Y and Z coordinate values of new shape specific points P9, PA, PB, PC and PD expressed with "Δ" are determined and the graphics data is updated again. Furthermore, the X, Y and Z coordinate values of the shape specific points P9, PA, PB, PC and PD are stored in the specific point storage 101.

In the case where the quadrangle section specified by the shape specific points P4, P1, P5 and P8, the quadrangle section specified by the shape specific points P8, P5, P2 and P6 and the quadrangle section specified by the shape specific points P7, P8, P6 and P3 are segmented, the X, Y and Z coordinate values can also be calculated using the same procedure.

When proceeding with segmentation, every time segmentation is repeated, the numerical range in which the random number generator 104 generates random numbers is narrowed by ½. The three-dimensional fractal graphics obtained in this way becomes a more natural graphics.

In the case where it is judged at step S108 that the shape is not segmented (step S109: No) or segmentation is finished (step S113: Yes), the graphics data stored in the work memory is sent to the drawing controller 311 of the GPU 31 and the graphics data generation processing is finished.

The drawing controller 311 carries out processing of drawing into the frame memory 32 based on this graphics data. The data drawn is sent to the display via the CRTC 33. Thus, a three-dimensional fractal graphics is shown on the display.

Thus, in this embodiment, the X and Y coordinate values of a shape specific point are used as the seed of random numbers to generate random numbers and the Z coordinate value of the relevant shape specific point is calculated using these random numbers, and therefore the Z coordinate value depends on the X and Y coordinate values and the value is uniquely determined by the X and Y coordinate values. Therefore, no matter how many times the three-dimensional fractal graphics formed including the shape specific point is drawn or even if the three-dimensional fractal graphics are drawn after other three-dimensional fractal graphics are drawn, it is possible to always obtain the graphics of almost the same shape.

This will be further explained in relation to the conventional problems.

Figure 7:
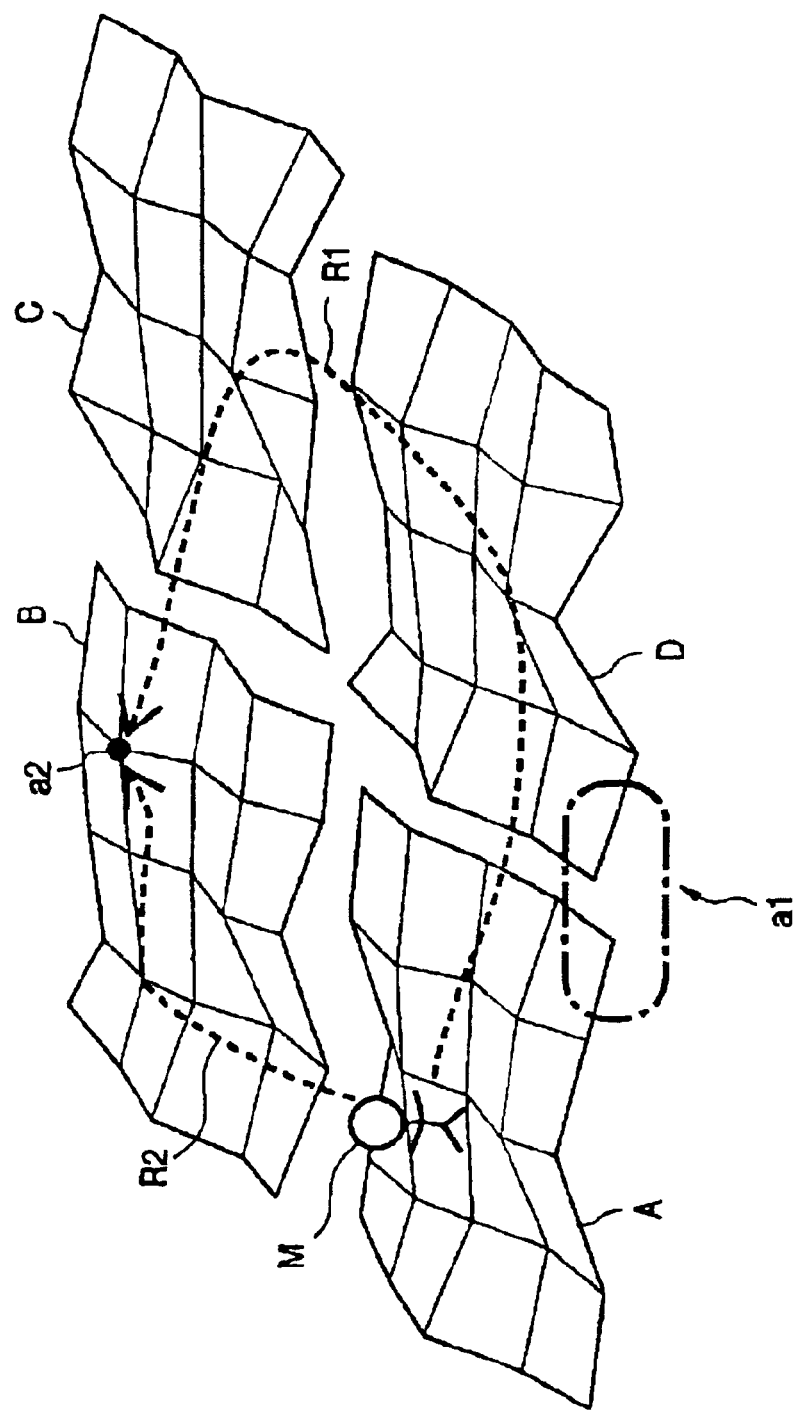
FIG. 7 is a schematic diagram showing effects of this embodiment in relation to the object of the present invention.

FIG. 7 assumes that there are three-dimensional fractal graphics in an image made up of four blocks A to D shown on the display which can show only one block per one screen and a character M who appears in a game moves around across blocks in this image.

When the character M moves to a neighboring block, the image shown is changed and the three-dimensional fractal graphics is also newly created every time.

The height (Z coordinate value) of an individual shape specific point to specify a three-dimensional fractal graphics is determined using random numbers, and the conventional art uses random numbers generated when the height of the immediately preceding shape specific point is determined as the seed of random numbers. For this reason, when one block is changed to another, the connection sections a1 between the neighboring three-dimensional fractal graphics do not match, resulting in an unnatural display mode.

Moreover, when the character M arrives at a target point a2 through a first route R1 of block A→block D→block C→block B and when the character M arrives at the target point a2 via a second route R2 of block A→block B, there may be a difference in the height of the target point a2, resulting in an unnatural display mode in this case, too.

The graphics generating apparatus of this embodiment has a three-dimensional fractal graphics in such an image made up of a plurality of blocks in this way, and even if one block is changed to another, the Z coordinate value of an individual shape specific point is determined using random numbers uniquely determined by the X and Y coordinate values of the shape specific point, and therefore the connection sections a1 of the three-dimensional fractal graphics do not mismatch on the border of the respective blocks and even if the character M arrives at the target point a2 of block B from block A through a different route, there is no more difference in the height of the target point a2.

This embodiment shows an example where X, Y and Z coordinate values of a midpoint are calculated by applying midpoint division to each shape specific point, random numbers are generated using the X and Y coordinate values as the seed, the Z coordinate value of the midpoint is determined based on the random numbers and the midpoint whose X, Y and Z coordinate values are determined is used as a new shape specific point. However, generation of new shape specific points need not always depend on midpoints, but any points between shape specific points can also be used for that purpose. Furthermore, regarding a midpoint or any point, only X and Y coordinate values may be calculated and these may be used as the seeds of random numbers.

Moreover, this embodiment takes a three-dimensional fractal graphics as an example because this embodiment assumes it as a precondition that graphics are drawn by computer graphics, but the technique of the present invention is also applicable to three-dimensional graphics other than fractal graphics in the same way.

<Modifications>

The present invention is also applicable to two-dimensional graphics in the same way. Such an embodiment will be explained below.

As the graphics generator, the one with the function shown in FIG. 2 formed by allowing the information processing apparatus 1 shown in FIG. 1 to load a computer program can be used as is.

Figure 8:
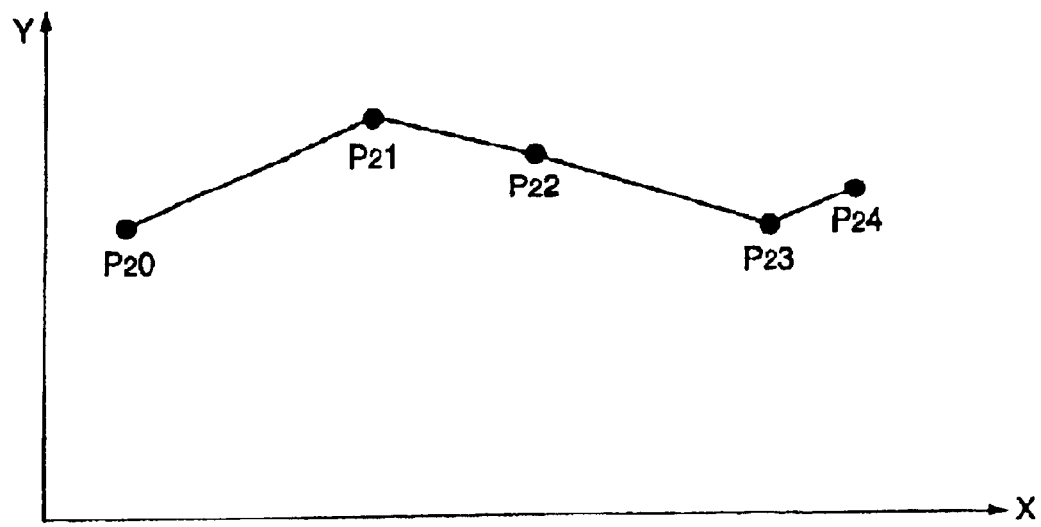
FIG. 8 is a schematic diagram showing an example of a two-dimensional graphics.

Here, an example where a two-dimensional graphics specified by five shape specific points P20 to P24 shown in FIG. 8 is segmented will be explained. The graphics data generating procedure in this case is as follows.

First, the X and Y coordinate values of the five shape specific points P20 to P24 are loaded from the shape specific point storage 101, and the X and Y coordinate values of a midpoint between the neighboring shape specific points when these shape specific points P20 to P24 are projected on the X-axis are calculated by the midpoint divider 103.

Then, using the calculated X coordinate value of the midpoint as the seed of random numbers, random numbers are generated by the random number generator 104 and the Y coordinate value of the midpoint is confirmed by these random numbers generated. The point determined by this confirmed Y coordinate value and the X coordinate value which becomes the seed of the random numbers when the random numbers are generated is used as a new shape specific point, and graphics data of a two-dimensional graphics is generated including the coordinate values of all these shape specific points.

Figure 9:
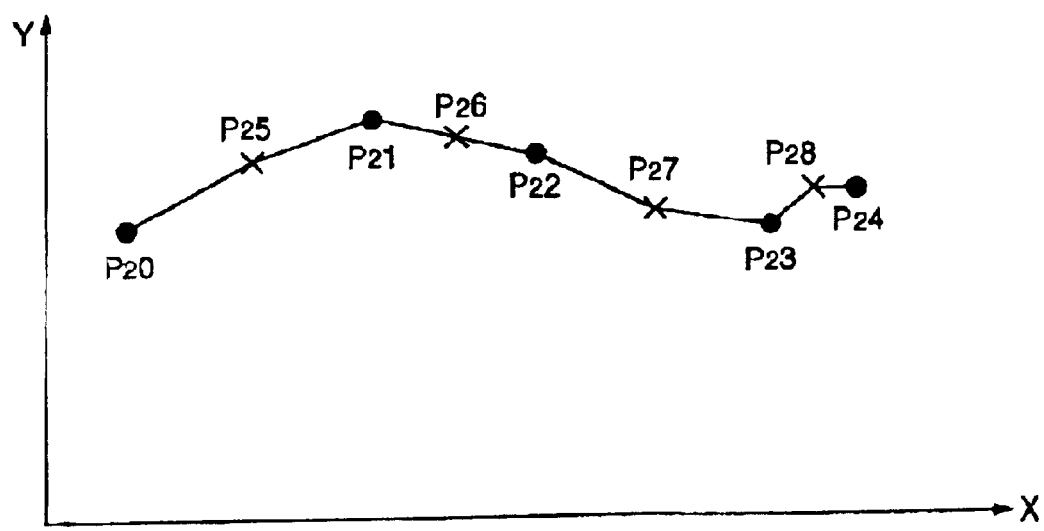
FIG. 9 is a schematic diagram showing an image of a two-dimensional graphics to be segmented.

P25 to P28 in FIG. 9 are the new shape specific points obtained by segmentation. By generating new shape specific points P25 to P28 in this way, it is possible to generate graphics data of a two-dimensional graphics, of a more natural shape and with improved reproducibility.

On the other hand, with respect to shape specific points, it is possible to load only an X coordinate value instead of loading both X and Y coordinate values or calculate the X coordinate value and use this as the seed of random numbers, which is a case similar to the case with three-dimensional graphics. Furthermore, it is also possible not always depend on midpoints but to use the X coordinate value of an arbitrary point between existing shape specific points as the seed of random numbers, calculate the Y coordinate value of the relevant point and use the point whose X and Y coordinate values are determined in this way as a new shape specific point.

This embodiment describes the procedure for segmenting two-dimensional or three-dimensional graphics using instructions from the operation unit 23 as external instructions, but it is also possible to use instructions from the computer program as external instructions. Furthermore, whether or not to segment graphics can be determined automatically according to the resolution (scale) when the graphics is shown on the display. In this case, it is desirable to prepare a table to define the degree of detail (what level of segmentation required on what scale) with respect to the resolution in the CPU 10 separately as this will speed up processing for generating graphics data.

Moreover, the functional blocks forming the core of the aforementioned graphics generating apparatus can also be implemented by installing the computer program recorded in the recording medium according to the present invention in a household general-purpose computer unit, etc. and allowing the CPU of the general-purpose computer unit to load and execute the computer program.

As shown above, when the positions of some of a plurality of shape specific points are expressed by default coordinate values and variable coordinate values, the present invention determines the positions of the relevant shape specific points by generating random numbers using a default coordinate value at any one of shape specific points as a seed and calculating variable coordinate values based on these random numbers, and can thereby determine the variable coordinate values only depending on the default coordinate value and avoid unnatural factors when graphics shapes are determined using random numbers.

Various embodiments and changes may be made thereunto without departing from the broad spirit and scope of the invention. The above-described embodiment intended to illustrate the present invention, not to limit the scope of the present invention. The scope of the present invention is shown by the attached claims rather than the embodiment. Various modifications made within the meaning of an equivalent of the claims of the invention and within the claims are to be regarded to be in the scope of the present invention.

What is claimed is:

1. A method of generating graphics data, the method comprising the steps of:

determining X and Y coordinate values of a shape specific point, the shape specific point being one of a plurality of points specifying the shape of a three-dimensional graphic;

generating a random number using two types of mutually different random number generating functions using the X and Y coordinate values as seeds;

calculating a Z coordinate value of said shape specific point based on the generated random number; and generating said graphics data based on the Z coordinate value and the X and Y coordinate values of said shape specific point.

2. A method for generating graphics data, the method comprising the steps of:

provisionally setting a shape specific point among a plurality of shape specific points specifying the shape of a three-dimensional graphic;

calculating X and Y coordinate values of said provisionally set shape specific point and generating a random number using two types of mutually different random number generating functions using the X and Y coordinate values as seeds;

calculating a Z coordinate value of said provisionally set shape specific point based on the generated random number; and using the point including the calculated X, Y and Z coordinate values as a new shape specific point and generating said graphics data based on said new shape specific point.

3. The graphics data generating method according to claim 2, wherein the X and Y coordinate values of said new shape specific point are the X and Y coordinate values of a midpoint of a virtual line connecting a pair of said plurality of shape specific points.

4. The graphics data generating method according to claim 2, wherein the X and Y coordinate values of said new shape specific point are the X and Y coordinate values of a midpoint of a virtual line connecting a midpoint of a first side of a quadrangle formed on a projecting plane when each of two pairs of said plurality of shape specific points is projected onto an XY plane, and a midpoint of a second side of said quadrangle facing said first side.

5. A method for generating graphics data, the method comprising the steps of:

provisionally setting a shape specific point between a pair of neighboring shape specific points of a plurality of shape specific points specifying the shape of a two-dimensional graphic when said plurality of shape specific points are projected onto an X-axis, wherein a position of at least one of said plurality of shape specific points is expressed by a default coordinate value and a variable coordinate value, the default coordinate value being the X coordinate value of the at least one shape specific point and the variable coordinate value being the Y coordinate value of the at least one shape specific point;

generating a random number using the X coordinate value of said provisional shape specific point as a seed of random numbers;

calculating the Y coordinate value based on the generated random number; and using the point including the calculated X and Y coordinate values as a new shape specific point and generating said graphics data based on the new shape specific point.

6. A graphics generating apparatus for generating graphics whose shape features are specified by positions of a plurality of shape specific points, comprising:

a random number generator for generating a random number whose value is determined according to an entered seed; and a determinator for determining positions of said plurality of shape specific points, wherein, for a two-dimensional graphic, the position of at least one of said plurality of shape specific points is expressed by a first default coordinate value being an X coordinate value and a first variable coordinate value being a Y coordinate value, and said determinator instructs said random number generator to generate a random number using said first default coordinate value as said seed and determines the position of said at least one shape specific point by calculating said first variable coordinate value based on said random number.

7. The graphics generating apparatus according to claim 6, wherein when there are a plurality of said first default coordinate values, said determinator generates said random number using random number generating functions, each said generating function differing from one of said first default coordinate values to another.

8. The graphics generating apparatus according to claim 6, wherein said graphics include three-dimensional graphics based on X, Y and Z coordinate values, wherein the position of at least one of said plurality of shape specific points is expressed by second default coordinate values and a second variable coordinate value such that a graphic of said three-dimensional graphics has as two of said second default coordinate values the X and Y coordinate values of said at least one of said plurality of shape specific points, and said second variable coordinate value is the Z coordinate value of said at least one of said shape specific points.

9. The graphics generating apparatus according to claim 6, wherein said three-dimensional graphics are three-dimensional fractal graphics, and said at least one shape specific point is determined to have at least substantially the same position, whether the position is determined through one route or through another route.

10. The graphics generating apparatus according to claim 8, wherein said graphic generation apparatus further comprises:

a storage unit for storing the X, Y and Z coordinate values of at least two of said plurality of shape specific points; and a shape specific point generator for specifying the positions of shape specific points based on the X, Y and Z coordinate values of a pair of said shape specific points read from said storage unit and for generating a new shape specific point at a midpoint of a virtual line connecting the pair of shape specific points, wherein said determinator instructs said random number generator to generate a random number using the X and Y coordinate values of said new shape specific point as said seed and determines the position of said new shape specific point by calculating the Z coordinate value of said new shape specific point based on the random number.

11. The graphics generating apparatus according to claim 10, wherein said shape specific point generator is operable to initially generate a plurality of said new shape specific points at a plurality of said midpoints of a plurality of said virtual lines connecting respective pairs of said shape specific points read from said storage unit when said pairs of said shape specific points are projected onto an XY plane, and is operable to newly generate new shape specific points from said initially generated new shape specific points, said newly generated new shape specific points being located at midpoints of second virtual lines connecting respective pairs of said initially generated new shape specific points.

12. The graphics generating apparatus according to claim 11, wherein said shape specific point generator repeatedly newly generates said new shape specific points according to external instructions using the last newly generated new shape specific points as said initially generated new shape specific points, and each time said new shape specific points are newly generated, said determinator changes a range of number values over which said random numbers are allowed to vary.

13. The graphics generating apparatus according to claim 11, wherein said storage unit additionally stores the X, Y and Z coordinate values of said new shape specific points generated as the shape specific points to be read.

14. A semiconductor device incorporated in an apparatus having a random number generator for generating a random number, the random number having a value determined according to an entered seed, the apparatus being operable to generate graphics whose shape features are specified according to the positions of a plurality of shape specific points, wherein the position of at least one of said plurality of shape specific points is expressed by default coordinate values and variable coordinate values, said semiconductor device comprising:

means for instructing said random number generator to generate the random number using said default coordinate values at any one of said shape specific points as said seed and determining the position of said one shape specific point by calculating said variable coordinate values based on the random numbers.

15. The semiconductor device according to claim 14, wherein said random number generator generates said random number using a plurality of random number generating functions using a plurality of existing ones of said default coordinate values, each said generating function differing from one of said default coordinate values to another.

16. A graphics generating apparatus for generating graphics whose shape features are specified by positions of a plurality of shape specific points, comprising:

a random number generator for generating a random number whose value is determined according to an entered seed; and a determinator for determining the positions of said plurality of shape specific points, wherein the position of at least one of said plurality of shape specific points is expressed by at least two default coordinate values and at least one variable coordinate value, and said determinator instructs said random number generator to generate a random number using at least two types of mutually different random number generating functions using said at least two default coordinate values at one of said shape specific points as said seed and said determinator determines the position of said at least one shape specific point by calculating said variable coordinate value based on said random number.

17. A machine-readable recording medium having instructions recorded thereon for performing a method of generating graphics data, the method comprising:

determining X and Y coordinate values of a shape specific point, the shape specific point being one of a plurality of points specifying the shape of a three-dimensional graphic;

generating a random number using two types of mutually different random number generating functions using the X and Y coordinate values as seeds;

calculating a Z coordinate value of said shape specific point based on the generated random number; and generating said graphics data based on the Z coordinate value and the X and Y coordinate values of said shape specific point.

* * * * *